United States Patent
Hardy et al.

[15] 3,665,841
[45] May 30, 1972

[54] BEVERAGE MAKER

[72] Inventors: Graham George Hardy, Stoke-on-Trent; Leonard Kenneth Morgan Masters, Newcastle-under-Hyme, both of England

[73] Assignee: Russell Hobbs Limited, Alperton, England

[22] Filed: May 13, 1970

[21] Appl. No.: 36,895

[30] Foreign Application Priority Data

June 11, 1969 Great Britain......................29,597/69

[52] U.S. Cl..............................................99/281, 99/319
[51] Int. Cl.........................................................A47j 31/00
[58] Field of Search....................99/280, 281, 282, 283, 310, 99/311, 312, 319

[56] References Cited

UNITED STATES PATENTS

| 1,884,070 | 10/1932 | Mennicke | 99/319 X |
| 3,132,580 | 5/1964 | Walker | 99/282 |
| 2,566,914 | 9/1951 | Worst | 99/282 |
| 3,280,721 | 10/1966 | Walker | 99/282 |

FOREIGN PATENTS OR APPLICATIONS

| 76,092 | 12/1893 | Germany | 99/282 |

Primary Examiner—Walter A. Scheel
Assistant Examiner—Philip R. Coe
Attorney—Merriam, Marshall, Shapiro & Klose

[57] ABSTRACT

A receptacle for tea leaves, coffee grounds or the like is releasably supported in the upper part of an electrically heated vessel by holding means until liquid in the vessel boils, whereupon a heat-responsive device, in response to heating by vapor from the boiling liquid, will effect the release of the receptacle so that it falls to a lower position where the liquid can flow into it. The descent of the receptacle also effects the interruption of the supply circuit of the heating means of the vessel.

12 Claims, 5 Drawing Figures

Patented May 30, 1972

BEVERAGE MAKER

SUMMARY OF THE INVENTION

This invention relates to a beverage-making apparatus.

When making tea or coffee it is desirable that the tea leaves or coffee grounds should not come into contact with the water in which they are to be infused until the temperature of the water has reached the boiling point. Previously two separate vessels, one for heating water to its boiling point and the other for infusion, have been used to achieve this desideratum.

An object of the present invention is to provide an improved beverage-making apparatus in which a beverage such as tea or coffee can be made in a single vessel instead of in two separate vessels, this single vessel being compact in the sense that it is capable of making a given quantity of tea or coffee in a volumetric space which is substantially smaller than the combined volumetric spaces of the two separate vessels previously used to make the same quantity of beverage.

According to the invention we provide a beverage making apparatus comprising a vessel adapted to be partly filled with a liquid to be boiled therein, a receptacle adapted to contain a material capable of infusion in said liquid to produce a beverage and arranged for movement within said vessel between an upper position above that at which said liquid can flow by gravity into said receptacle and a lower position in which liquid can flow by gravity into said receptacle, holding means for releasably supporting said receptacle in said upper position, and means for effecting the release of said receptacle from said holding means on being heated by vapor generated by the boiling of liquid in said vessel, thereby permitting the receptacle to fall to said lower position for infusion of the material therein by said liquid.

DETAILED DESCRIPTION

Figure 1:
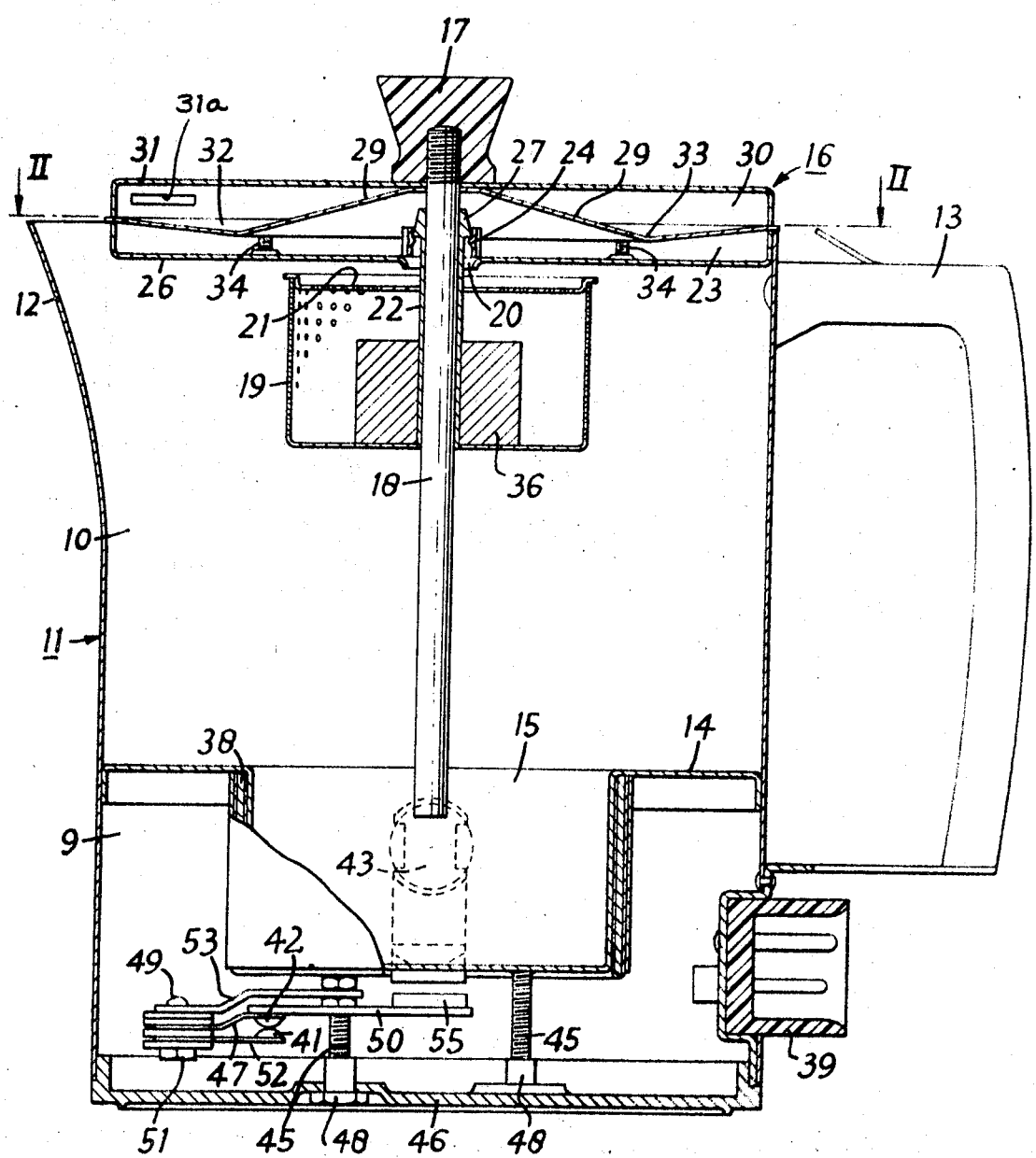
FIG. 1 is a vertical section of a beverage-making apparatus according to the invention.
Figure 2:
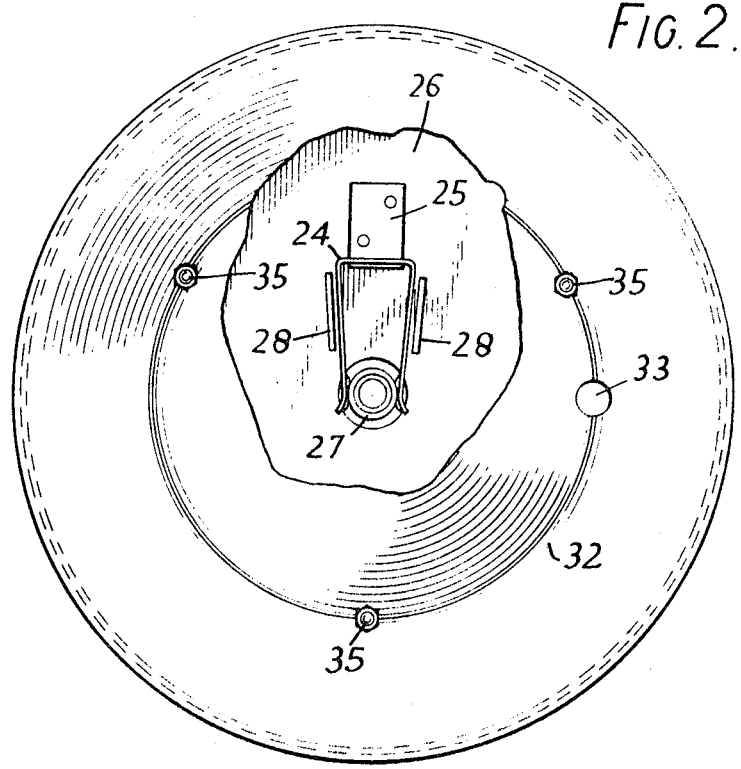
FIG. 2 is a section on the line II — II of FIG. 1, partly broken away to illustrate an interior part.
Figure 3:
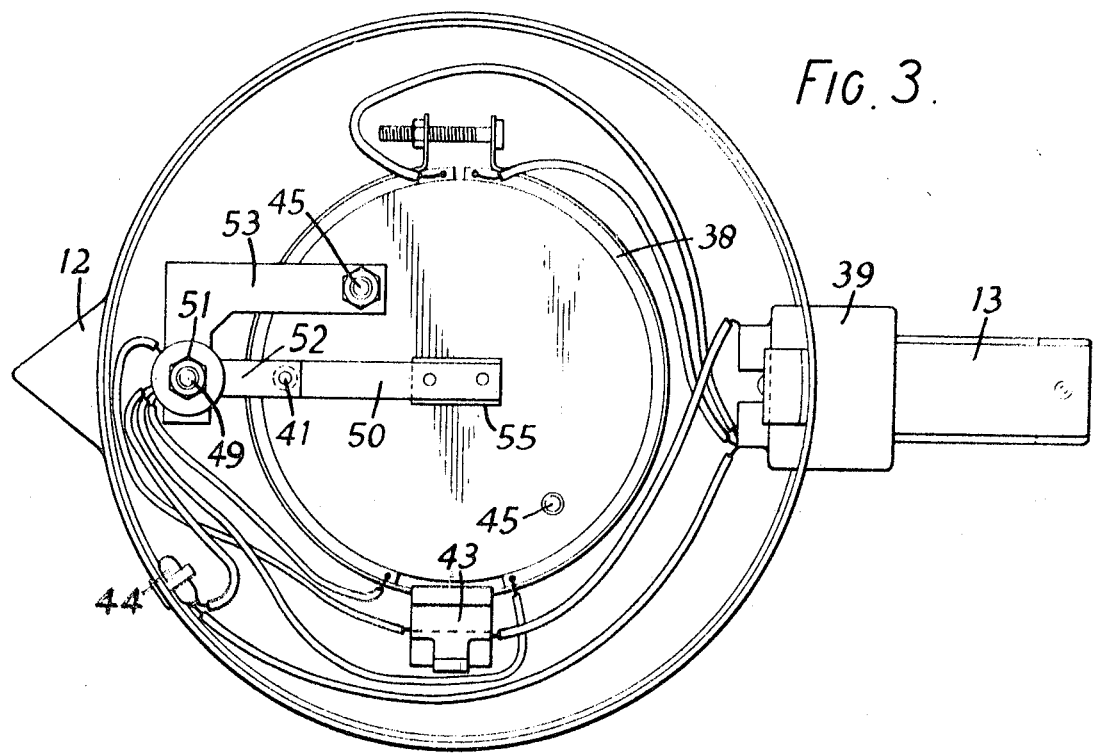
FIG. 3 is an underneath plan view of the apparatus of FIG. 1, a bottom plate being removed to reveal interior parts.

In the beverage-making apparatus illustrated in FIGS. 1 to 3 of the drawings, a single vessel 11 serves both as a kettle in which water for tea making can be boiled and also as a teapot in which tea leaves are infused in the water so boiled. The vessel 11 which is of substantially cylindrical shape is provided with a sprout 12 and a handle 13. A division plate 14 divides the interior of the vessel 11 into an upper compartment 10 which serves as a liquid container and a lower compartment 9 in which electrical components are located. The division plate 14 which is made of a non-magnetic material, such as stainless steel, is formed with a downwardly recessed center portion providing a cylindrical well 15.

The vessel 11 has a removable double-compartment lid, indicated generally by the reference 16, which is provided with a knob 17.

The upper end of a depending guide rod 18, which is located coaxially with respect to the well 15, is fixed to the lid 16 and the knob 17 is screwed on its projecting upper end.

Slidably mounted on the guide rod 18 is a perforated cylindrical receptacle 19 in the form of a basket for containing tea leaves and provided with a perforated lid 21 which can be secured in the mouth of the tea-basket by locking means (not illustrated). The tea-basket 19, which is smaller, both in diameter and depth, than the well 15 has a central guide sleeve 22 fixed to its base, which sleeve is a sliding fit on the guide rod 18 and projects upwardly through a central opening 20 in the lid 16.

The double-compartment lid 16 has a lower compartment 23 containing a holding means for releasably supporting the tea-basket 19, such means comprising a stirrup-shaped bimetallic strip element 24 carried by a bracket 25 riveted to the bottom plate 26 of the lid 16. The two arms of the element 24 are provided near their free ends with horizontally extending pressed out ridges which are arranged to engage beneath the larger-diameter lower edge of a frusto-conical head 27 on the upper end of the guide sleeve 22. Two slots 28 are formed in the bottom plate 26 of the lid to allow steam generated in the compartment 10 to be discharged against the two arms respectively of the bimetallic strip element 24, as a result of which the said two arms will move apart and become disengaged from the frusto-conical head 27, allowing the tea basket 19 to slide down the guide rod 18 into the well 15 in the division plate 14.

The lower compartment 23 of the double-compartment lid 16 is separated from the upper compartment 30 thereof by a plate 29 having a conical middle portion which slopes downwardly from a central apex immediately below the top plate 31 of the lid 16 to an annular drip channel 32 formed by the junction of the base of the middle portion with that of a frusto-conical outer marginal portion. A hole 33 is formed in the plate 29 to allow steam to escape upwardly from the lower compartment 23 into the upper compartment 30 of the lid. This hole 33 is also located in a position to serve as a drain hole for the drip channel 32. Water drained from the upper compartment 30 of the lid through this hole 33 will eventually leave the lower compartment 23 of the lid through the central hole in the plate 26, which hole for this purpose, has a downwardly curved rim.

The plate 29 is secured to the bottom plate 26 of the lid 16 by screws 34 having heads located in countersunk recesses in the said plate 26 and nuts 35 engaging over the plate 29. Slots, one of which is shown at 31a, are provided on the periphery of the upper compartment of the lid to allow some steam to escape into the atmosphere.

A permanent magnet 36 is fixed centrally in the lower part of the tea basket 19. In order to avoid corrosion, the magnet 36 is encapsulated within a silicone rubber body (not separately shown). The tea basket 19 and its lid 21 are made of aluminum alloy so as to be non-magnetic.

The base 46 is held in position by two cap nuts 48 engaging on studs 45 soldered to the base of the well 15.

An electrical heating element 38 closely surrounding the recessed center portion of the division plate 14 is connected in a circuit including the terminals of a supply socket 39, a switch having a fixed contact 41 and a movable contact 42, a boil dry switch 43 and an indicator lamp 44.

The switch having the contacts 41, 42 is carried by a bracket 53 secured at one end between two nuts on one of the studs 45, while its other end is clamped to a resilient metal strip arm 47 and a rigid supporting strip 52 by means of a screw 49 and nut 51. Washers of insulating material are arranged between the metal parts 53, 47 and 52. Fixed to the end part of the arm 47 carrying the movable contact 42 and forming an extension of the said arm 47 is an insulating strip 50 carrying an armature 55 of magnetizable material which is arranged, when the tea-basket 19 descends into the well 15, to be attracted upwardly so as to separate the movable contact 42 from the fixed contact 41.

In order to make tea in the tea-making apparatus described above, after removing the lid 16 and the tea-basket 19, the upper compartment 10 of the vessel 11 is filled with water to the required level. A suitable quantity of tea is introduced into the tea-basket 19 and, after the lid 21 of the latter has been replaced and firmly secured, the tea basket is slid over the guide rod 18 until the frustoconical head 27 is engaged and held between the arms of the bimetallic strip element 24. The lid 16 with the tea-basket 19 supported beneath it is then replaced in the position shown in FIG. 1. It will be noted that the tea-basket is thus releasably held in a position above the level to which the vessel is normally filled with water, so that water cannot flow into the tea basket under the influence of gravity.

After the apparatus has been connected to the mains, by inserting a plug, (not shown) on the end of a connecting cable (also not shown) into the socket 39, the element 38 will heat up and will, in due course, cause the water in the compartment 10 to boil. Steam will now pass upwardly through the slots 28 in the bottom plate 26 of the lid and play upon the arms of the bimetallic strip element 24. As a result, these arms will move apart and become disengaged from the head 27, so that the tea-basket 19 will be released and will slide down the guide rod 18 into the well 15 in the division plate 14 whereupon water will flow under the influence of gravity into the tea-basket and infusion of the tea in the boiling water will take place. A further result of movement of the tea-basket into the well is that the armature 55 will be attracted upwardly by the magnet 36, causing the movable contact 42 to be disengaged from the fixed contact 41 and hence interrupting the supply of electrical current to the heating element 38.

In the meantime, the steam from the lower compartment 23 of the lid will have passed upwardly into the upper compartment of the latter where part of it will condense. The resulting condensate will collect in the drip channel 32 and then flow down through the opening 33 into the lower compartment 23 of the lid from which it will eventually drain through the central hole in the bottom plate 26 into the upper compartment 10 of the vessel 11.

Preferably, when the apparatus is not in use, the tea-basket 19 is kept in the well 15 in the division plate 14. Manual means (not shown) may however, be provided for disengaging the arms of the bimetallic strip element from the head 27 of the sleeve 22, in which case the tea basket may be left clipped into the lid 16 (not shown).

In an alternative construction, (not shown) the lid, instead of being provided with a guide rod such as 18 (FIG. 1), has only a short rod projecting downwardly from the lid 16 in order to locate the central sleeve 22 of the tea basket. A spigot coaxial with, and having its lower end fixed to the base of, the downwardly recessed center portion of a division plate corresponding to the plate 14 serves as the locating means for the lower end of a separate and removable guide tube, the upper end of which locates in the lower end of the central sleeve 22 of the tea basket. Advantages of this construction are that the assembly consisting of the lid and basket, when removed from the vessel 11, can be placed on a table in an upright position and will then remain stable in this position. Another advantage is that cleaning of the guide tube is facilitated.

In a modification of the construction illustrated, the magnet is carried below the well 15 by the arm 47 and the armature is encapsulated within the tea basket 19. In a further alternative construction a magnet is carried below the well 15 by the arm 47 and a further magnet is carried by the tea basket 19, the magnets being arranged with unlike poles presented towards each other.

In another embodiment (not illustrated) of this invention, the guide means is in the form of a hollow tube secured by its lower end to the base of the well, while its upper end is closed. An armature located in the upper end part of the guide tube is connected by a connecting rod to the movable contact carrying member of a normally open circuit breaker below the division plate. The tea basket has an encapsulated magnet which acts on the armature so that, reversed, or the basket is close to the lid, the armature will operate through the connecting rod to hold the movable contact of the circuit breaker against the fixed contact thereof and thereby maintain the electrical circuit containing the heating element closed. A small movement of the basket, such as takes place as soon as the basket is released by the bimetallic strip element, will however produce misalignment of the magnet and the armature, as a result of which the contacts of the switch will be opened. In this case also the positions of the magnet and the armature can be reversed, or two magnets could be employed.

The boil dry switch 43 can be eliminated, in which case protection against boiling dry may be provided by arranging for a bimetallic strip fixed at a suitable level on the well 15 to be operatively connected to the switch having the contacts 41, 42, in such a manner that these contacts are opened if the vessel overheats.

The apparatus described above may be used for making coffee instead of tea and may be combined with a clock in an automatic tea or coffee maker.

Figure 4:
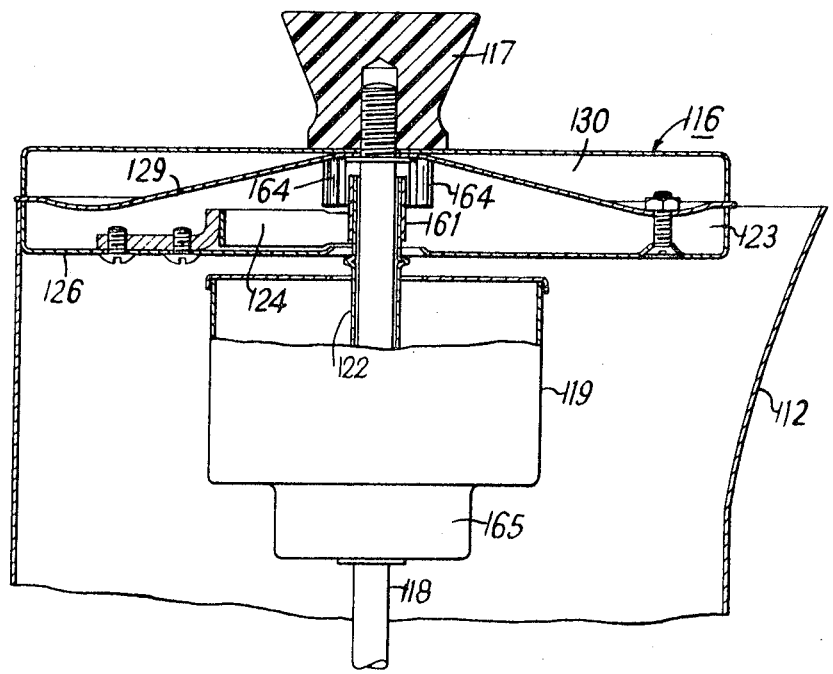
FIG. 4 is a fragmentary view of a second embodiment of the invention shown in vertical section.
Figure 5:
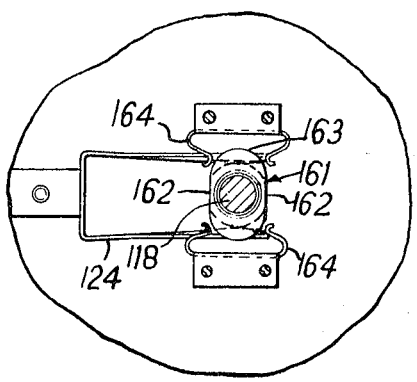
FIG. 5 is a fragmentary plan view of certain parts of the apparatus of FIG. 4.

In the second embodiment illustrated in FIGS. 4 and 5 the need for the manual means for disengaging the arms of the bimetallic strip element from the head is avoided. In many respects the second embodiment is identical with the embodiment described with reference to FIGS. 1 to 3, and certain of those features which do not differ significantly are not shown in FIGS. 4 and 5 and will not be described in detail with reference to the second embodiment.

In the second embodiment the head 161 of the tea-basket 119 has two opposite flat sides 162 and two oppositely projecting rounded portions 163. In one angular position of the head 161, that shown in FIG. 5, two arms of the bimetal 124 engage under the two oppositely projecting rounded portions 163. Two spring clips 164 are provided, the ends of which act to prevent rotation of the head 161 from the angular position shown in FIG. 5. In order to engage the tea-basket 119 beneath the lid 116, it is slid over the guide tube 118 with the head 161 in an angular position in which the flat sides 162 are aligned with the arms of the bimetal 124. In this angular position the ends the ends of the arms of the bimetal 124 do not touch the head 161. The tea basket 119 is now rotated through 90° engaging the oppositely projecting rounded portions 163 over the two arms of the bimetal 124. During this rotational movement, the rounded portion 163 displace the ends of the spring clips 164 which thus act to provide a positive indication that the head 161 has been rotated to the correct position for engagement of the rounded portions 163 with the end of the bimetal arm 124. In the angular position of the head 161 shown in FIG. 5, the spring clips 164 do not grip the rounded portions 163, but act to prevent rotation of the head 161 from that position. At any time, however, the tea basket 119 may be released by rotating it with sufficient force to overcome the resistance of the spring clips 164.

Another feature of the second embodiment which is shown in FIGS. 4 and 5 is that the magnet is housed in a bottom extension 165 of the tea-basket 119. The bottom extension is hermetically sealed with respect to the main chamber afforded by the tea-basket, and also with respect to the guide sleeve 122. An advantage of this feature is that a greater quantity of tea can be accommodated in the tea-basket 119, as compared with the tea-basket shown in FIG. 1. Furthermore, when the tea-basket 119 is in the well 115 the bottom extension 165 rests on the floor of the well allowing access of water to the floor of the tea-basket. This modified form of tea-basket is more convenient for cleaning since it does not include an annular space corresponding to the annular space between the magnet 36 and the side walls of the tea-basket 19 of the first embodiment.

We claim:
1. A beverage-making apparatus comprising:
   a. A vessel adapted to be partly filled with a liquid to be boiled therein,
   b. a receptacle adapted to contain a material capable of infusion in said liquid to produce a beverage and arranged for movement within said vessel between an upper position above that at which said liquid can flow by gravity into said receptacle and a lower position in which liquid can flow by gravity into said receptacle,
   c. holding means for releasably supporting said receptacle in said upper position,
   d. means for effecting the release of said receptacle from said holding means on being heated by vapor generated by the boiling of liquid in said vessel, thereby permitting the receptacle to fall to said lower position for infusion of the material therein by said liquid, e. electrical heating means mounted in the vessel for heating the liquid therein,
f. a supply circuit for said heating means,
g. a switch connected in said supply circuit and having switch contacts closable to energize said heating means, and
h. switch-operating means responsive to the descent of the receptacle to its lower position to effect the opening of said switch contacts.

2. An apparatus according to claim 1 wherein:
a. the said switch-operating means includes first and second elements, one at least of which is a magnet and the other of which is formed of a magnetizable material,
b. the first element of the switch-operating means is arranged for movement with the receptacle,
c. the second element of the switch-operating means is movably mounted in a part of the vessel located close to the first element when the receptacle is in its lower position and is operatively connected to one of said switch contacts for separating said one switch contact from the other switch contact when said second element is moved by magnetic attraction towards said first element as a result of the descent of the receptacle to its lower position.

3. An apparatus according to claim 2 wherein the vessel is sub-divided by a division plate of non-magnetizable material into an upper compartment for containing the liquid to be boiled and a lower compartment containing the electrical heating means and said switch.

4. An apparatus according to claim 3 wherein the first element of said switch-operating means is a magnet and the second element is an armature and the armature is arranged to be attracted upwardly by the magnet to separate the switch contacts when the receptacle descends to its lower position.

5. An apparatus according to claim 4 wherein the division plate is formed with a centrally located well of a shape and size for receiving the receptacle, and said well is surrounded circumferentially by said electrical heating means.

6. An apparatus according to claim 2 wherein:
a. the vessel is provided with a removable hollow lid having a top wall and a bottom wall that is formed with a central aperture,
b. a guide rod is fixed to and depends vertically downward from the top wall in said lid through said central aperture,
c. said receptacle has a central guide sleeve whereby it is slidably guided on said guide rod for vertical movement between its upper and lower positions,
d. said guide sleeve has an upward extension provided with a shaped head, said extension being adapted to project upwardly through said central aperture in the bottom wall of the lid when the receptacle is in its upper position,
e. said holding means includes a bimetallic element which constitutes said means for effecting the release of said receptacle, and is mounted within said hollow lid adjacent said central aperture, and has two arms arranged to grip opposite sides of said guide sleeve extension beneath said shaped head, said two arms being arranged to move apart on being heated by vapor generated by the boiling of said liquid in the vessel and entering the lid.

7. An apparatus according to claim 6 wherein the magnet of the switch-operating means is a magnet surrounding the lower end part of the guide sleeve.

8. An apparatus according to claim 7 wherein:
a. the receptacle comprises a substantially cylindrical chamber for holding the material to be infused, and
b. the magnet is disposed in a lower portion of said chamber and is encapsulated in a material which is impervious to boiling water.

9. An apparatus according to claim 7 wherein the receptacle comprises a substantially cylindrical chamber for holding the material to be infused and a substantially cylindrical bottom extension coaxially aligned with said chamber and enclosing said magnet, the bottom extension being hermetically sealed off from said chamber and being hermetically sealed with respect to the guide sleeve.

10. An apparatus according to claim 1 comprising temperature sensitive means arranged in thermal communication with said electrical heating means for opening the electrical circuit through said switch in response to overheating of said heating means.

11. A beverage-making apparatus comprising:
a. a vessel adapted to be partly filled with a liquid to be boiled therein,
b. a receptacle adapted to contain a material capable of infusion in said liquid to produce a beverage and arranged for movement within said vessel between an upper position above that at which said liquid can flow by gravity into said receptacle and a lower position in which liquid can flow by gravity into said receptacle,
c. holding means for releasably supporting said receptacle in said upper position,
d. a compartment in an upper part of the vessel, said compartment communicating with the interior of the vessel,
e. vent means for venting said compartment and thereby establishing a vapor flow path from the interior of the vessel through said compartment,
f. temperature responsive means disposed within said compartment in the path of vapor generated on boiling of liquid in said vessel for effecting the release of said receptacle from said holding means on being heated by said vapor, thereby permitting the receptacle to fall to said lower position for infusion of the material therein by said liquid.

12. Apparatus according to claim 11 wherein the vessel further comprises a removable lid having at least upper and lower walls which define said compartment, an aperture in said lower wall affording communication between the interior of the vessel and the interior of the lid.

* * * * *